United States Patent [19]
Hatakeda et al.

[11] Patent Number: 6,057,837
[45] Date of Patent: *May 2, 2000

[54] ON-SCREEN INDENTIFICATION AND MANIPULATION OF SOURCES THAT AN OBJECT DEPENDS UPON

[75] Inventors: Darrin N. Hatakeda, Redmond; Howard W. Cherry, IV, Seattle; John P. O'Neill, Kirkland; Russell S. Johnson, Seattle; Juha P. Niemisto, Mercer Island, all of Wash.

[73] Assignee: Microsoft Corporation, Redmond, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/892,737

[22] Filed: Jul. 15, 1997

[51] Int. Cl.[7] .................................................. G06F 15/00
[52] U.S. Cl. .......................................... 345/339; 345/338
[58] Field of Search ........................... 345/339, 326–338, 345/340, 341–351, 352–355; 707/503–505

[56] References Cited

U.S. PATENT DOCUMENTS

| | | | |
|---|---|---|---|
| 5,235,673 | 8/1993 | Austvold et al. | 395/76 |
| 5,261,080 | 11/1993 | Khoyi et al. | 395/500 |
| 5,303,379 | 4/1994 | Khoyi et al. | 395/700 |
| 5,586,316 | 12/1996 | Tanaka et al. | 395/613 |
| 5,634,124 | 5/1997 | Khoyi et al. | 395/614 |
| 5,771,380 | 6/1998 | Tanaka et al. | 395/615 |
| 5,787,440 | 7/1998 | Bakke et al. | 707/103 |

*Primary Examiner*—Steven Sax
*Attorney, Agent, or Firm*—Jones & Askew, LLP

[57] ABSTRACT

Manipulating an object that is dependent upon one or more cells in a spreadsheet is facilitated by manipulating indicators that bound the relevant cells. The object can be a spreadsheet cell formula that contains a reference to one or more cells. The object can also be a graph object that is dependent upon one or more cells. In response to the selection of one of the objects, an indicator is displayed proximate to the cell or cells that the object is dependent upon. If the selected object is dependent upon multiple ranges of cells, then multiple indicators are displayed. Each indicator is displayed proximate to a cell or range of cells for the purpose of highlighting or identifying that the object is dependent upon that cell or range of cells. The highlighting or identifying is acceptably achieved with on-screen indicators that are color-coded. Each indicator can border a cell or a range of cells that the object is dependent upon. Each indicator can be moved, expanded or contracted so that it includes a different cell or range of cells. The selected object is updated to be dependent upon the cells currently identified by the associated indicator or indicators.

19 Claims, 13 Drawing Sheets

|     | B6  |   ▽   | = | =SUM(B2:D2)-SUM(E3) |        |          |   |
| --- | --- | ----- | --- | --- | --- | --- | --- |
|     | A   | B     | C | D | E | F | G |
| 1   |     | Year 1 | Year 2 | Year 3 | Totals | Averages |   |
| 2   | Sales | 34,000 | 57,000 | 88,000 | 179,000 | 59,667 |   |
| 3   | Expenses | 6,900 | 7,500 | 8,500 | 22,900 | 7,633 |   |
| 4   | Profits | 27,100 | 49,500 | 79,500 | 201,900 | 52,033 |   |
| 5   |     |       |   |   |   |   |   |
| 6   | Deviation | 156,100 |   |   |   |   |   |
| 7   |     |       |   |   |   |   |   |
| 8   |     |       |   |   |   |   |   |

PRIOR ART
FIG. 1c

|     | B2  |   ▽   | = | 34000 |   |   |
| --- | --- | ----- | --- | --- | --- | --- |
|     | A   | B     | C | D | E | F |
| 1   |     | Year 1 | Year 2 | Year 3 | Totals | Averages |
| 2   | Sales | 34,000 | 57,000 | 88,000 | 179,000 | 59,667 |
| 3   | Expenses | 6,900 | 7,500 | 8,500 | 22,900 | 7,633 |
| 4   | Profits | 27,100 | 49,500 | 79,500 | 201,900 | 52,033 |
| 5   |     |       |   |   |   |   |
| 6   |     |       |   |   |   |   |

|     | A | B | C | D | E | F |
|---|---|---|---|---|---|---|
|     |   | = | Sales | | | |
|     | A2 ▼ | | | | | |
| 1 |   | Year 1 | Year 2 | Year 3 | Totals | Averages |
| 2 | Sales | | | | | |
| 3 | Sales | | | | | |
| 4 | Sales | | | | | |
| 5 | Sales | | | | | |
| 6 | Sales | | | | | |
| 7 | Sales | | | | | |
| 8 | Sales | | | | | |
| 9 | Sales | | | | | |
| 10 |  | | | | | |

|     | A | B | C | D | E | F |
|---|---|---|---|---|---|---|
|     | I9 ▼ | = | | | | |
| 1 |  | Year 1 | Year 2 | Year 3 | Year 4 | |
| 2 | Sales | 34,000 | 57,000 | 88,000 | 179,000 | |
| 3 | Fix Cost | 800 | 800 | 800 | 2,000 | |
| 4 | Var Cost | 300 | 375 | 400 | 1000 | |
| 5 | | | | | | |
| 6 | Margins | | | | | |
| 7 | 0.01 | | 900 | | | |
| 8 | 0.05 | | | | | |
| 9 | 0.1 | | | | | |
| 10 | | | | | | |

| | A | B | C | D | E | F |
|---|---|---|---|---|---|---|
| | SUM | ▽ | X ✓ = | =(Sales Year 1)*A8-(Fix Cost Year 1) | | |
| 1 | | Year 1 | Year 2 | Year 3 | Year 4 | |
| 2 | Sales | 34,000 | 57,000 | 88,000 | 179,000 | |
| 3 | Fix Cost | 800 | 800 | 800 | 2,000 | |
| 4 | Var Cost | 300 | 375 | 400 | 1000 | |
| 5 | | | | | | |
| 6 | Margins | | 900 | | | |
| 7 | 0.01 | | =(Sales Year 1)*A8-(Fix Cost Year 1) | | | |
| 8 | 0.05 | | | | | |
| 9 | 0.1 | | | | | |
| 10 | | | | | | |

FIG. 3c

| | A | B | C | D | E |
|---|---|---|---|---|---|
| | SUM | ▽ | X ✓ = | =(B2)*A8-B3 | |
| 1 | | Year 1 | Year 2 | Year 3 | Year 4 |
| 2 | Sales | 34,000 | 57,000 | 88,000 | 179,000 |
| 3 | Fix Cost | 800 | 800 | 800 | 2,000 |
| 4 | Var Cost | 300 | 375 | 400 | 1000 |
| 5 | | | | | |
| 6 | Margins | | 900 | | |
| 7 | 0.01 | | =(B2)*A8-B3 | | |
| 8 | 0.05 | | | | |
| 9 | 0.1 | | | | |
| 10 | | | | | |

FIG.3d

|   | A | B | C | D | E | F |
|---|---|---|---|---|---|---|
| | SUM | ▽ | X ✓ = | =(C2)*A7-C4 | | |
| 1 | | Year 1 | Year 2 | Year 3 | Year 4 | |
| 2 | Sales | 34,000 | 57,000 | 88,000 | 179,000 | |
| 3 | Fix Cost | 800 | 800 | 800 | 2,000 | |
| 4 | Var Cost | 300 | 375 | 400 | 1000 | |
| 5 | | | | | | |
| 6 | Margins | | | | | |
| 7 | 0.01 | | =(C2)*A7-C4 | | | |
| 8 | 0.05 | | | | | |
| 9 | 0.1 | | | | | |
| 10 | | | | | | |

FIG.3e

|   | A | B | C | D | E | F |
|---|---|---|---|---|---|---|
| | SUM | ▽ | X ✓ = | =(C2)*A7-C4 | | |
| 1 | | Year 1 | Year 2 | Year 3 | Year 4 | |
| 2 | Sales | 34,000 | 57,000 | 88,000 | 179,000 | |
| 3 | Fix Cost | 800 | 800 | 800 | 2,000 | |
| 4 | Var Cost | 300 | 375 | 400 | 1000 | |
| 5 | | | | | | |
| 6 | Margins | | | | | |
| 7 | 0.01 | | =(B2)*A8-(B3:D4) | | | |
| 8 | 0.05 | | | | | |
| 9 | 0.1 | | | | | |
| 10 | | | | | | |

ON-SCREEN INDENTIFICATION AND MANIPULATION OF SOURCES THAT AN OBJECT DEPENDS UPON

TECHNICAL FIELD

The present invention relates to the identification and manipulation of sources that a computer-generated object depends upon, and more particularly relates to the identification and manipulation of a range of spreadsheet cells that are referred to by spreadsheet cell formulas or define graphs.

BACKGROUND OF THE INVENTION

Most modern computer software employs a graphical user interface (GUI) to convey information to and receive commands from. users. The GUI relies on a variety of elements or objects, including icons, text, numerals, drop-down menus, dialog boxes, toolbars, buttons, and the like. A user typically interacts with a GUI by using a pointing device (e.g., a mouse) to position an on-screen pointer or cursor over an on-screen object and "single-clicking" or "double-clicking" on the object. "Single-clicking" means pressing and releasing a button on a mouse 42 (FIG. 2), or the like, whereas "double-clicking" means repeatedly pressing and releasing a button on a mouse 42, or the like. An example of an operating system that provides GUI is the "WINDOWS 95" operating system, which is manufactured and sold by Microsoft Corporation of Redmond, Wash.

Most modem spreadsheet application programs operate in a GUI environment. An example of a spreadsheet or worksheet application program that operates in a GUI environment is the "EXCEL 97" program, which is manufactured and sold by Microsoft Corporation of Redmond, Wash. FIG. 1a–1g illustrate portions of spreadsheet screen displays that disclose features of a prior version of the "EXCEL" spreadsheet application program (i.e., "EXCEL" 95 Version 7.0), which should be understood by those skilled in the art.

Referring to FIG. 1a for example, the prior art spreadsheet screen displays include multiple on-screen objects which are referred to as cells. Each cell is capable of containing information or objects such as words, numerals, and symbolic expressions or formulas. The cells are arranged in a two-dimensional array and identified by column identifiers and row identifiers. As depicted in FIG. 1a, column identifiers A–G are above respective columns of the cells, and row identifiers 1–8 are to the left of respective rows of the cells. Accordingly, those skilled in the art will appreciate that the cell B2 contains "34,000" and the range of cells B2:F4 includes all of the cells containing a number greater than 1,000. More particularly, the range of cells B2:F4 includes the cells B2, C2, D2, E2, F2, B3, C3, D3, E3, F3, B4, C4, D4, E4, and F4.

As depicted in FIG. 1a, the cell B6 has been selected by a user with an On-Screen pointer 100. A single cell is selected, for example, by using a input device such as a mouse 42 (FIG. 2) to position the pointer 100 over the cell, and then "single-clicking" the mouse 42. Multiple cells can be selected, for example, by positioning the pointer 100 over one of the cells to be selected, pressing and holding down a button on the mouse 42, and moving the pointer 100 across other cells to be selected. Once desired cells have been selected, the button on the mouse 42 is released. Selection of a cell or range of cells with the pointer 100 causes a selection border 102 to bound the selected cell or range of cells. The selection border 102 bounds the cell B6 in FIG. 1a. A selection handle 104, which is in the form of a box, is included at the lower right corner of the selection border 102. In FIG. 1a, because the cell B6 has been selected, it is in a "selection mode." The selection border 102 bounding the cell B6 is defined by double lines. While a cell is selected, any symbolic expression or formula contained by that cell (referred to hereafter as a cell formula) is depicted in a formula bar 106. For example, in FIG. 1a a cell formula that at least partially defines the content of the cell B6 is depicted in the formula bar 106. Those skilled in the art should appreciate that the cell formula depicted in FIG. 1a defines that the value depicted in the cell B6 is equal to the value in cell B2 minus the value in cell F2.

Cell formulas can be edited or created when their respective cell has been selected for "edit mode." FIG. 1b depicts a prior spreadsheet screen display like that of FIG. 1a, except that the cell B6 has been selected for edit mode. Selection for edit mode can occur in at least two different ways. Referring to FIG. 1a, it is conventional for the edit mode to be entered for a selected cell, which is bounded by the section border 102, by moving the pointer 100 to the formula bar 106, and then single-clicking the mouse 42 (FIG. 2). That causes the insertion point (the point at which text will be inserted in response, for example, to typing on an associated keyboard 40 (FIG. 2)) to be displayed within the formula bar 106. The edit mode can also be conventionally entered for a cell by positioning the pointer 100 over the cell and double-clicking. That will cause any cell formula contained by the selected cell to be displayed in the selected cell itself and the formula bar 106, and the insertion point will also be displayed in the selected cell. Edit mode can also be entered for a selected cell, which is bounded by the section border 102, by typing on the associated keyboard 40. The typing causes the cell formula contained by the selected cell and the insertion point to appear in the selected cell. Edit mode can also be conventionally entered by positioning the pointer 100 over a cell and single-clicking, and then pressing the "F2" key on the keyboard 40.

As depicted in FIG. 1b, when a cell is in edit mode, it is bounded by the selection border 102' which is defined by single lines. Also, in edit mode the right side of the selection border 102' is not shown and portions of the selection handle 104' are not shown so that they do not interfere with the displaying of the cell's formula. The edit mode can be terminated, for example, by hitting the "enter" or "return" key on the associated keyboard 40 (FIG. 2).

Cell formulas typically contain references to sources. Each source is a cell or a range of cells. For example, the cell formula for the cell B6, which is depicted in the formula bar 106 in FIG. 1a–b and in the cell B6 in FIG. 1b, includes two references. A first reference in the cell formula depicted in FIG. 1a–b is the reference "B2," which identifies the cell B2 as a first source of information used by the cell formula. A second reference in the cell formula depicted in FIG. 1a–b is the reference "F2," which identifies the cell F2 as a second source of information used by the cell formula. Accordingly, for FIG. 1a–b, those skilled in the art should appreciate that as a result of the cell formula, references, and sources, the cell B6 displays "−25,667," (FIG. 1) which is equal to the number depicted in the cell B2 minus the number depicted in the cell F2.

As depicted in FIG. 1a–b, a menu bar 108 is provided that provides access to various commands of the prior art spreadsheet software product. The menu bar 108 includes several major headings. Each heading represents a menu that drops down when the user clicks on the heading in the menu bar 108. This allows access to commands that are listed in the drop down menu. A user selects a particular command from a drop down menu by dragging the pointer down to the command and operating a button on the mouse 42 (FIG. 2). Drop down menus provide a space-efficient means for organizing and displaying numerous commands.

The menu bar 108 provides access to a "trace precedents" command that identifies the sources identified by the references of a cell formula (see FIG. 1c). The menu bar 108 also provides access to a "trace dependents" command that identifies the cells that include cell formulas having a reference to a selected cell (see FIG. 1d). These features must be accessed through a "Tools" pull down menu and an "Auditing" sub-menu (not shown) associated with menu bar 108. These features can also be accessed through the selection of corresponding buttons on a tool bar (not shown). Toolbars are common GUI elements that provide another effective way to display numerous computer commands. Toolbars provide access to a set of commands that are usually represented by buttons. A user can invoke any command in the toolbar by single-clicking on the associated button.

FIG. 1c illustrates a portion of a prior spreadsheet screen display after the cell B6 has been selected, and the "trace precedents" command has been chosen. In FIG. 1c the cell B6 is bounded by the selection border 102, which indicates that cell B6 is selected. As seen in the formula bar 106 of FIG. 1c, the cell B6 includes or is defined by a cell formula with reference "B2:D2" and reference "E3." Accordingly, as a result of the performance of the "trace precedents" feature, blue tracer arrows 110 and a blue tracer border 112, which bounds the range of cells B2:D2, are displayed to identify the range of cells B2:D2 and the cell E3, which are the sources that the displayed cell formula and selected cell depend upon. Because of the tracer arrows 110 and tracer border 112, the sources for the displayed cell formula are readily apparent.

FIG. 1d illustrates a portion of a prior spreadsheet display after cell B2 has been selected, and the "trace dependents" command has been chosen. In FIG. 1d, cell B2 is bounded by the selection border 102, which indicates that cell B2 is selected. As indicated by the formula bar 106 of FIG. 1d, the cell B2 does not include a cell formula, but includes the number "34000." However, each of the cells B4, E2, and F2 include a cell formula containing the reference "B2." Accordingly, as a result of the performance of the "trace dependence" feature, blue tracer arrows 110 are displayed to identify the cell B2 as a source for the cells B4, E2, and F2 and their cell formulas.

Referring to FIG. 1a–d, each of the "trace precedents" and "trace dependents" features must be accessed through a menu bar 108 or the selection of items on a tool bar (not shown). Referring to FIG. 1c–d, once the "trace precedents" and "trace dependents" features are performed and the resulting tracer arrows 110 or tracer border 112 are displayed, the displayed tracer arrows 110 and tracer borders 112 remain stationary. Once displayed, the tracer arrows 110 and tracer borders 112 cannot be manipulated, with the exception that they can be deleted by way of selecting commands from the menu bar 108 (FIG. 1a–b) or a tool bar (not shown). Thus, while they provide some assistance in deciphering the sources that cells and cell formulas depend upon, they are of limited value because they cannot be directly used to manipulate the sources. Also, the tracer arrows 110 and the tracer borders 112 are not automatically displayed when a cell formula is being edited, and there is no color coordination between references in the cell formula and the tracer arrows 110 and the tracer borders 112.

While the prior version of the "EXCEL" spreadsheet software discussed with reference to FIG. 1a–g includes conventional means for identifying and editing references within cell formulas, those means can be somewhat labor intensive. For example, the insertion point can be placed within a cell formula in the ways discussed above to allow for editing of the cell formula via keys on the associated keyboard 40 (FIG. 2). Additionally, while the insertion point is within a cell formula, a reference to a cell or range of cells (i.e., source) can be inserted into the cell formula by selecting one or more cells of the spreadsheet with the pointer 100. When a cell or range of cells are so selected, that cell or range of cells is temporarily bounded by a broken-line border, and a reference to that bordered cell or range of cells is inserted into the cell formula at the insertion point.

Another feature of the prior "EXCEL" spreadsheet software provides for the copying of cells. For example, with reference to FIG. 1e, the selection border 102 indicates that the cell A2 has been selected. As discussed in greater detail below, when the pointer 100 is moved proximate to the selection handle 104, the pointer 100 transforms into a thin "cross" (i.e., thinner than the cross-like pointer 100 depicted in FIG. 1a), as depicted in FIG. 1f. Alternatively, when the pointer 100 is moved proximate to the selection border 100 but is displaced from the selection handle 104, the pointer 100 transforms into an arrow, as depicted in FIG. 1e. When the pointer 100 is in the form of an arrow, the selection border 102 and the contents of the cell that is bounded by the selection border 100 can be moved. Movement is achieved, for example, by pressing and holding down a button on the mouse 42 (FIG. 2), and then moving the pointer 100. Once the selection border 100 has been moved to the desired location, the button on the mouse 42 is released and the moved cell contents and selection border 102 remain in that desired location.

Referring to FIG. 1f, when the pointer 100 is proximate to the selection handle 104, the pointer 100 transforms into the thinner "cross." When the pointer 100 is in the form of the thinner cross, the selection handle 104 and portions of the selection border 102 directly connected to the selection handle 104 can be moved to resize the selection border 102. More particularly, when the pointer 100 is in the form of a thinner cross, the selection handle 104 and portions of the selection border 102 directly connected to the selection handle 104 can be moved to expand or contract (if the selection border 102 bounds more than one cell) the size of the selection border 102. Such expansion or contraction is achieved by pressing and holding down the button on the mouse 42 (FIG. 2), and moving the pointer 100. Once the selection border 100 has been resized as desired, the button on the mouse 42 is released. For example, the selection handle 104 and portions of the selection border 102 are being "dragged" in FIG. 1f, and have been "dropped" in FIG. 1g to enlarge the selection border 102. The prior version of the "EXCEL" spreadsheet software includes an "auto-fill" feature such that the above-discussed "dragging and dropping" of a selection handle 104 causes the content of the cell or cells originally bounded by the selection border 102 to be copied into the cells bounded by the enlarged selection border 102.

Those skilled in the art will appreciate that the prior version of the "EXCEL" spreadsheet software discussed with reference to FIG. 1a–g includes numerous features that make the program intuitive and user friendly. Nonetheless, further improvements are desired to enhance the intuitive and user friendly nature of that software product. For example, deciphering the sources identified by references within cell formulas can be cumbersome. Further, the prior art methods for editing references in cell formulas are relatively labor intensive. Moreover, dealing with the symbolic expressions or formulas that are used to define graphs from spreadsheet data can be even more labor intensive and difficult.

Therefore, there is a need in the art for improved methods for discerning the sources identified by references within cell formulas, and for editing or manipulating those references and sources. There is also a need in the art for improved methods for discerning and editing or manipulating the sources that define graphs. More generally, there is a need for methods that diminish the reliance upon the symbolic expressions or formulas associated with spreadsheets and their associated graphs. This would allow software users to more quickly and easily utilize spreadsheet and graphing software.

SUMMARY OF THE INVENTION

The present invention satisfies the above-described needs by providing an improved system and method for identifying and manipulating the source or sources that an object is dependent upon. For one aspect of the present invention, the object is a cell formula or a spreadsheet cell having a cell formula that contains a reference to a source, or references to sources, that the cell formula or spreadsheet cell is dependent upon. In accordance with another aspect of the present invention, the object is a graph object that is associated with a spreadsheet and dependent upon a source or sources. In accordance with both aspects, each source is preferably a cell or a range of cells in a spreadsheet.

More particularly, in response to the activation of an object by a user, if that object is dependent upon one source, then an indicator is displayed proximate to that source. An object can be activated by selecting or creating the object. If the activated object is dependent upon multiple sources, then multiple indicators are displayed. Each indicator is displayed proximate to a source for the purpose of highlighting or identifying that source. The highlighting or identifying is acceptably achieved with visual on-screen indicators. As mentioned above, each source is preferably a cell or a range of cells in a spreadsheet. Each indicator can border or bound a cell or a range of cells that the object is dependent upon.

Additionally, the present invention provides a method of altering the characteristics of an activated object by the on-screen manipulation of indicators. Each indicator can be moved or resized through the action of a user so that it includes a different cell or range of cells. For example, a user can use a mouse and associated pointer to "drag and drop" entire indicators or portions of indicators to change their location or size, respectively. The selected object is constantly updated to be dependent upon the cells currently identified by the associated indicator or indicators.

In another aspect of the present invention, when an object is activated by a user with an on-screen pointer or keyboard, or the like, a formula is displayed that at least partially defines the object and comprises one or more references that identify the source or sources for the selected object. In further response to the aforementioned on-screen manipulation of an indicator, each reference in the displayed formula is updated. Additionally, each reference is color-coded with the respective indicator to allow a user to readily discern the relationships between the object, references, indicators, and sources.

The various aspects of the present invention may be more clearly understood and appreciated from a review of the following detailed description of the disclosed embodiments and by reference to the appended drawings and claims.

BRIEF DESCRIPTION OF THE DRAWINGS

FIG. 1a–g each illustrate a portion of a prior art spreadsheet screen display.

FIG. 3a illustrates a portion of a prior art spreadsheet screen display.

FIGS. 3b–e illustrate portions of spreadsheet screen displays that include color-coded indicator borders and references, in accordance with the first exemplary embodiment of the present invention.

DETAILED DESCRIPTION

The present invention is directed toward a method and system for identifying the source or sources (e.g., secondary objects such as cells or ranges of cells in a spreadsheet) that a primary object (e.g., a cell or cell formula, or a graph object) is dependent upon by associating a identifier with each of the sources. The present invention is further directed toward a method and system that provides for the direct on-screen manipulation of the identifiers to change the source or sources and thereby the object or objects that depend upon the modified sources. In one embodiment, the invention is incorporated into a spreadsheet application program entitled "EXCEL 97," marketed by Microsoft Corporation of Redmond, Wash. Briefly described, the "EXCEL 97" application program allows a user to organize information in spreadsheets and graphs, and includes the above-discussed features.

Turning now to the drawings, where like numbers reference like parts in the several figures, various exemplary embodiments of the present invention will be described.

EXEMPLARY OPERATING ENVIRONMENT

Figure 2:
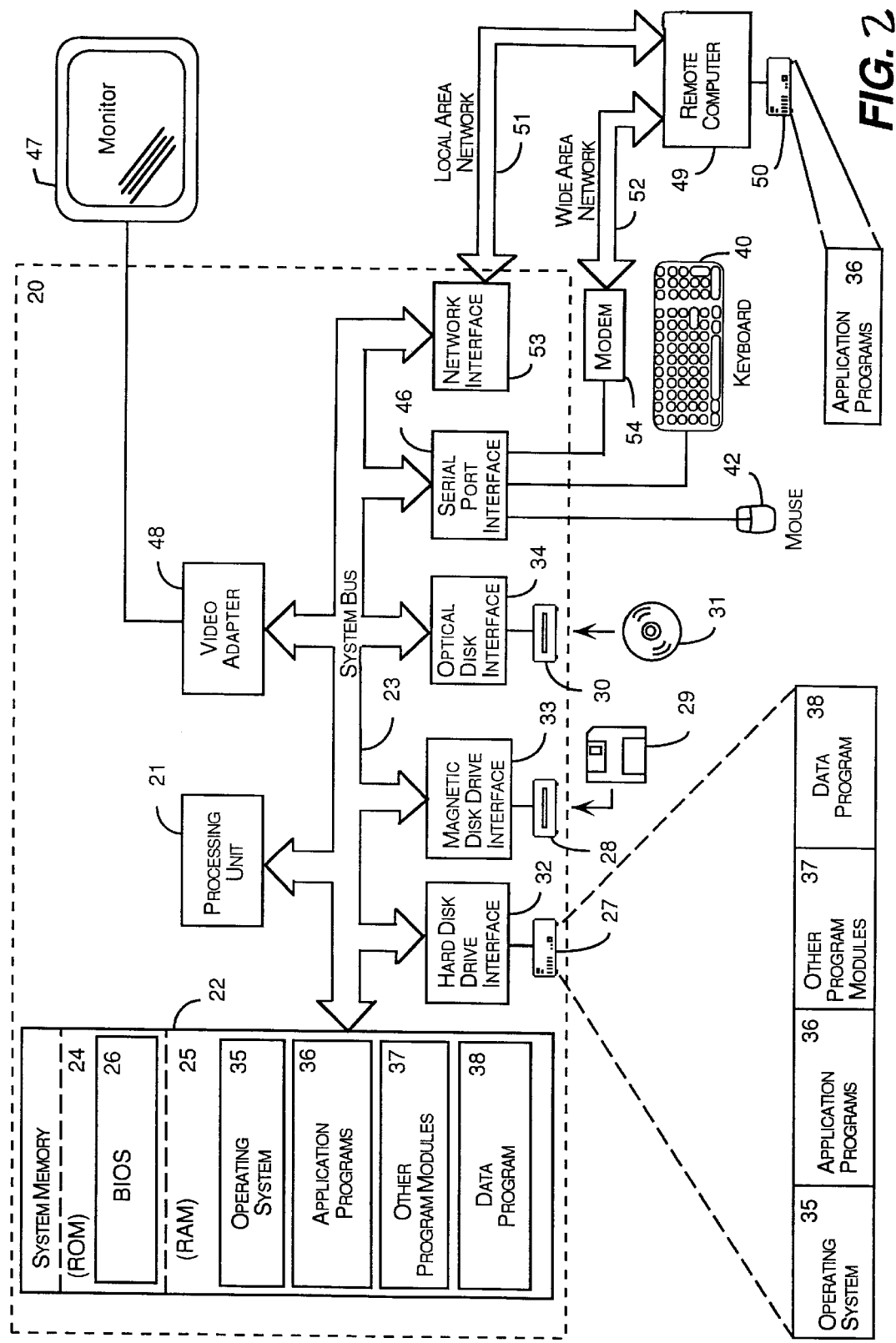
FIG. 2 is a block diagram of a personal computer that provides the operating environment for the exemplary embodiments of the present invention.

FIG. 2 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 2, an exemplary system for implementing the invention includes a conventional personal computer 20, including a processing unit 21, a system memory 22, and a system bus 23 that couples the system memory 22 to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47, or another type of display device that presents screen displays that can be viewed by a user, is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

SOURCES FOR A CELL OR CELL FORMULA

Figure 4:
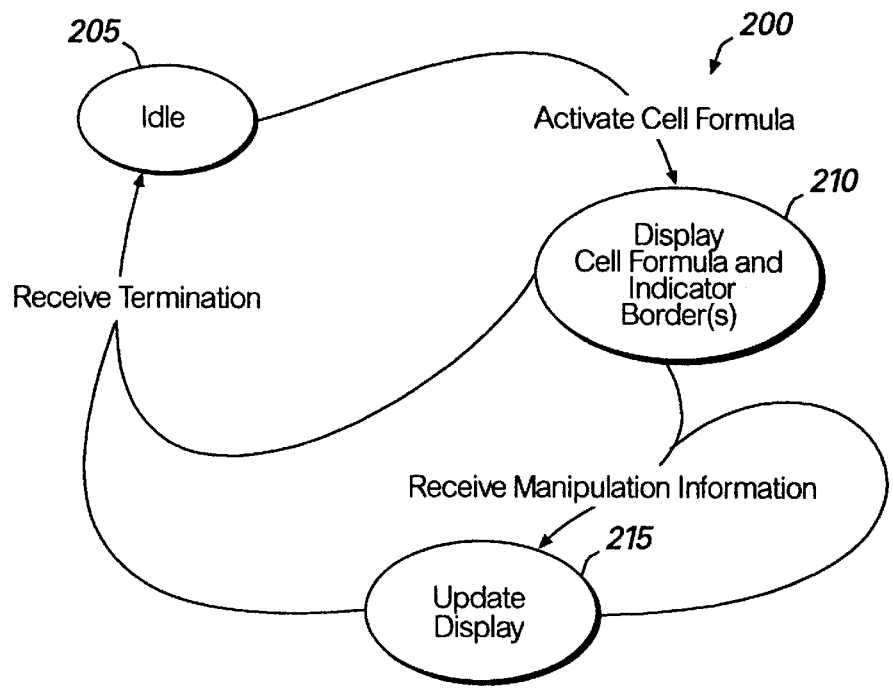
FIG. 4 is a state diagram illustrating an exemplary method for altering the references of a spreadsheet cell formula in response to manipulation of indicator borders, in accordance with the first exemplary embodiment of the present invention.

A first exemplary method for identifying and manipulating the source or sources (e.g., secondary objects such as cells or ranges of cells in a spreadsheet) that a primary object (e.g., a cell or cell formula) depends upon is illustrated in FIGS. 3b–e, which illustrate portions of spreadsheet screen displays, and FIG. 4, which is a state diagram that illustrates an exemplary method 200. While FIGS. 3b–e illustrate portions of spreadsheet screen displays that include features of the exemplary embodiments, FIG. 3a illustrates a portion of a prior spreadsheet screen display.

Referring to FIG. 3b, in accordance with the first exemplary embodiment of the present invention, in response to a cell that is part of a spreadsheet screen display being conventionally selected by a user for edit mode (edit mode is discussed in the "Background of the Invention" section), a selection border 102' is placed about that cell in a conventional manner. When a cell that is selected for edit mode has a cell formula that includes a reference or references, or when such a cell formula is being created for the selected cell, the cell formula can be characterized as being activated. The references within the activated cell formula are highlighted with visual characteristics such as different colors. In addition, the sources, which are the cells or ranges of cells identified by the highlighted references, are visually highlighted with, for example, indicator borders 114a–c. As depicted in FIG. 3b, each indicator border 114a–c bounds a cell or range of cells in the spreadsheet screen display. The indicator borders 114a–c are movable and resizable and include indicator handles 116a–c, respectively. By highlighting the references and bounding the sources with the indicator borders 114a–c, the sources can be easily discerned and manipulated.

Referring to FIG. 4, the exemplary method 200 is carried out by highlighting the references, activating the indicator borders 114a–c, and responding to the on-screen manipulation of the borders 114a–c by a user. Those skilled in the art will appreciate that the process described by the state diagram illustrated in FIG. 4 is executed by the processing unit 21 (FIG. 2) in response to instructions that have been incorporated into various program modules. The method 200 illustrated in FIG. 4 begins at the idle state 205. The term "idle" is meant to indicate only that the edit mode has not been entered for a cell containing a cell formula with a reference or references. For comparison purposes FIG. 3a illustrates a prior art spreadsheet screen display in an idle state.

As mentioned above, when the edit mode is entered for a cell that contains a cell formula that includes a reference or references, or when such a cell formula is being created for the selected cell, the cell formula can be characterized as being activated. When a cell formula is activated, the method 200 proceeds to state 210. Referring additionally to FIG. 3b, at state 210, in response to and contemporaneously with the activation of the cell formula, the selection border 102' is displayed about the selected cell and the cell formula is displayed in the formula bar 106 and the selected cell. In addition, the references within at least one of the displayed cell formulas are highlighted, and the sources corresponding to the highlighted references are identified with indicator borders 114a–c.

Examples of portions of spreadsheet screen displays in state 210 (i.e., in edit mode and including a cell formula) are depicted in FIGS. 3b–c. Each of the displays of FIGS. 3b–c can be modified to exhibit an appearance identical to the display depicted in FIG. 3a when a user terminates the edit mode for those screen displays by, for example, hitting a "return" or "enter" key on the keyboard 40 (FIG. 2). The user can also hit an "esc" key on the keyboard 40 to terminate edit mode and undo changes. That is, in response to entering the edit mode for the cell C7 of FIG. 3a, the display screen of either FIG. 3b or FIG. 3c can be presented on the monitor 47 (FIG. 3), depending upon the format of the cell formula in the cell C7. Both of FIGS. 3b–c are presented to make it clear that the concepts of the present invention are not limited to any specific cell formula format. For example, the cell formula depicted in FIG. 3b includes references that are in the English language, whereas the cell formula depicted in FIG. 3c includes references that identify cells by alphabetic column identifiers and numeric row identifiers. Many reference formats are within the scope of the present invention. Further, the present invention seeks to diminish the need for users to decipher references in formulas.

As mentioned above, in accordance with an exemplary embodiment of the present invention, each reference within at least one of the cell formulas being displayed during the edit mode is highlighted. If the cell formula in the formula bar 106 is being edited or created (i.e., if at least a portion of a cell formula and the insertion point are in the formula bar 106), that formula is active and the references in the formula bar 106 are highlighted. If the formula in a cell is being edited or created (i.e., if at leat a portion of a cell formula and the insertion point are both within a cell), that formula is active and the references in that cell are highlighted. Alternatively, the references in both of the depicted cell formulas can be highlighted. More particularly, each reference within a cell formula being displayed during the edit mode is given a unique visual characteristic, such as a color, and its corresponding indicator border 114 is given that same visual characteristic. For example, with reference to FIG. 3b, for the depicted cell formula that is currently capable of being edited (i.e., the cell formula displayed in the formula bar 106 or the cell C7), the text of the reference "Sales Year 1" is blue, and that reference identifies the cell B2 that is bordered by a blue indicator border 114a; the text of reference "A8" is green, and that reference identifies the cell A8 that is bordered by a green indicator border 114c; and the text of reference "Fix Cost year 1" is purple, and that reference identifies the cell B3 that is bordered by a purple indicator border 114b. Similarly, with reference to FIG. 3c, for the depicted cell formula that is capable of being edited (i.e., the cell formula displayed in the formula bar 106 or the cell C7), the text of reference "B2" is blue, and that reference identifies the cell B2 that is bordered by a blue indicator border 114a; the text of reference "A8 " is green, and that reference identifies the cell A8 that is bordered by a green indicator border 114c; and the text of reference "B3" is purple, and that reference identifies the cell B3 that is bordered by a purple indicator border 114b.

The text of each reference in a cell formula is colored to match the color of the corresponding indicator border 114.

From the left, the first reference in a cell formula is blue, the second reference is dark green, the third reference is dark purple, the fourth reference is brown, the fifth reference is light green, the sixth reference is pink, the seventh reference is light purple, and that pattern of color is repeated for any following references.

Referring still to FIG. 4, manipulation of the indicator borders 114 or references causes the method 200 to transition from the edit mode of state 210 to the update display mode in state 215. As mentioned above, each of the indicator borders 114 can be directly manipulated on-screen by a user operating a pointer 100, or the like. Referring to FIG. 3e, for example, when the pointer 100 is moved so that the pointer 100 is proximate to a handle 116, the pointer 100 transforms into a thin "cross." Alternatively, when the pointer 100 is moved proximate to an indicator border 114 but is displaced from an indicator handle 116, the pointer 100 transforms into an arrow, as depicted in FIG. 3d.

Referring to FIG. 3d, when the pointer 100 is in the form of an arrow, the indicator border 114 proximate to the pointer 100, but not the matter bounded by that indicator border 114, can be moved by a user by "dragging and dropping" the indicator border 114. "Drag and drop" movement is achieved, for example, by pressing and holding down the button on the mouse 42 (FIG. 2), and moving the pointer 100. Once the indicator border 114 has been moved to the desired location, the button on the mouse 42 is released and the indicator border 114 remains in that desired location.

Referring to FIG. 3e, as mentioned above an indicator border 114 can also be manipulated by a user when the pointer 100 is proximate to its indicator handle 116. In that configuration, the pointer 100 transforms into a thin "cross." When the pointer 100 is in the form of a thin cross, the indicator handle 116 and portions of the indicator border 114 directly connected to the indicator handle 116 can move with the pointer 100 to resize the indicator border 114. More particularly, when the pointer 100 is in the form of a thin cross, the indicator handle 116 and portions of the indicator border 114 directly connected to the indicator handle 116 can be moved by "dragging and dropping" to expand or contract (if the indicator border 114 bounds more than one cell) the area bounded by the indicator border 114. In accordance with alternative embodiments, each corner of an indicator border 114 is equipped with an indicator handle 116 which allows for resizing of the indicator border 114.

Referring again to FIG. 4, in response to conventional manipulation of a cell formula being edited or created by a user, or in response to on-screen manipulation of indicator borders 114 by a user with the pointer 100 as discussed above, the exemplary method 200 transitions from the edit mode of state 210 to an update display mode in state 215. The exemplary method 200 also can remain in the update display mode of state 215 in response to the reception of manipulation information. In response to a user changing the references in the displayed cell formula in a conventional manner (discussed in the "Background of the Invention" section), the indicator borders 114 are moved, created and deleted as necessary so that they bound the cell or range of cells that the modified or new references in the cell formula identify. For example, as a result of conventional editing by a user of a reference in a cell formula being edited, the corresponding indicator border 114 associated with the reference edited is resized or moved to identify the same cells as the edited reference in the cell formula. As an additional example, as a result of a user conventionally inserting a reference in a cell formula being edited, a corresponding indicator border 114 is added to the screen display to identify the same cells as the new reference in the cell formula. Similarly, in response and contemporaneously with the on-screen manipulation of indicator borders 114 with a pointer 100 or the like, the screen display is updated.

As an example of a response to on-screen manipulation of the indicator borders 114, as soon as any one of the indicator borders 114*a–c* are moved by a user with the pointer 100 from the positions indicated in FIG. 3*c* to the positions indicated in FIG. 3*d*, the cell formula displayed in FIG. 3*c* is automatically updated so that it appears as indicated in FIG. 3*d*. The references in the cell formula being edited are automatically updated so that they correspond to the cells bounded by the indicator borders 114*a–c*. In FIG. 3*d*, for example, in the cell formula being edited, the text of reference "C2" is blue, and the reference identifies the cell C2 that is bordered by the blue indicator border 114*a*; the text of reference "A7" is green, and the reference identifies the cell A7 that is bordered by the green indicator border 114*c*; and the text of reference "C4" is purple, and the reference identifies the cell C4 that is bordered by the purple indicator border 114*b*.

As another example of a response to on-screen manipulation of the indicator borders 114, in response to a user resizing an indicator border 114, the cell formula for the cell that is in edit mode is contemporaneously updated. In response to a user enlarging the indicator border 114*b* with the pointer 100 from the configuration depicted in FIG. 3*c* to the configuration depicted in FIG. 3*e*, the displayed cell formula can be contemporaneously updated so that it appears as displayed in FIG. 3*e*. For the cell formula being edited in FIG. 3*e*, the text of reference "B2" is blue, and the reference identifies the cell B2 that is bordered by the blue indicator border 114*a*; the text of reference "A8" is green, and the reference identifies the cell A8 that is bordered by the green indicator border 114*c*; and the text of reference "B3:D4" is purple, and the reference identifies the range of cells B3:D4 that are bordered by the purple indicator border 114*b*.

In summary, each time that a transition is made to state 215 in the method 200, either by transition from state 210 or state 215 due to on-screen manipulation of a indicator border 114, or conventional manipulation of a cell formula, the screen display is automatically updated so that the references in the cell formula being edited and the corresponding indicator borders 114 each identify the same cells.

If a cell formula being edited or created has two or more separate but alike references that each refer to the same cell or range of cells, then a single shared indicator boarder is used to identify the cell or range of cells for the alike references, and the alike references and the shared indicator boarder are identically colored. If the shared indicator boarder is manipulated on-screen by a user operating a pointer 100, or the like, then only the first of the corresponding alike references (i.e., the alike reference that is farthest left in the cell formula being edited or created) is modified in response to the on-screen manipulation. A new indicator boarder is generated for and color coordinated with the other of the originally alike references. Additionally, indicator boarders that overlap are "stacked" such that for overlapping indicator boarders, the indicator boarder corresponding to the reference that is farthest to the left in the cell formula is on top. In some cases it is necessary to move an indicator boarder that is on top of a lower indicator boarder in order to manipulate the lower indicator boarder on-screen with a pointer 100, or the like.

Referring still to FIG. 4, while at state 210 or state 215, if edit mode is terminated by the user, the method 200 returns to the idle state 205. When transitioning to the idle state 205, the color coding of the cell formula references is ceased and the indicator borders 114 are removed from the screen. In addition, the cell formula for the cell being edited is "executed" and the resulting number or the like is displayed in the cell.

In accordance with an alternative embodiment of the present invention, when a cell with a cell formula is not in edit mode but is selected and bound by a selection border 102 (FIG. 1*a* and 1*c–e*) so that its cell formula is displayed in the formula bar 106, the references in the displayed cell formula are highlighted and the corresponding color-coded source borders 114 are displayed and can be manipulated by a user in the ways described above.

SOURCES FOR A GRAPH OBJECT

Figure 5A:
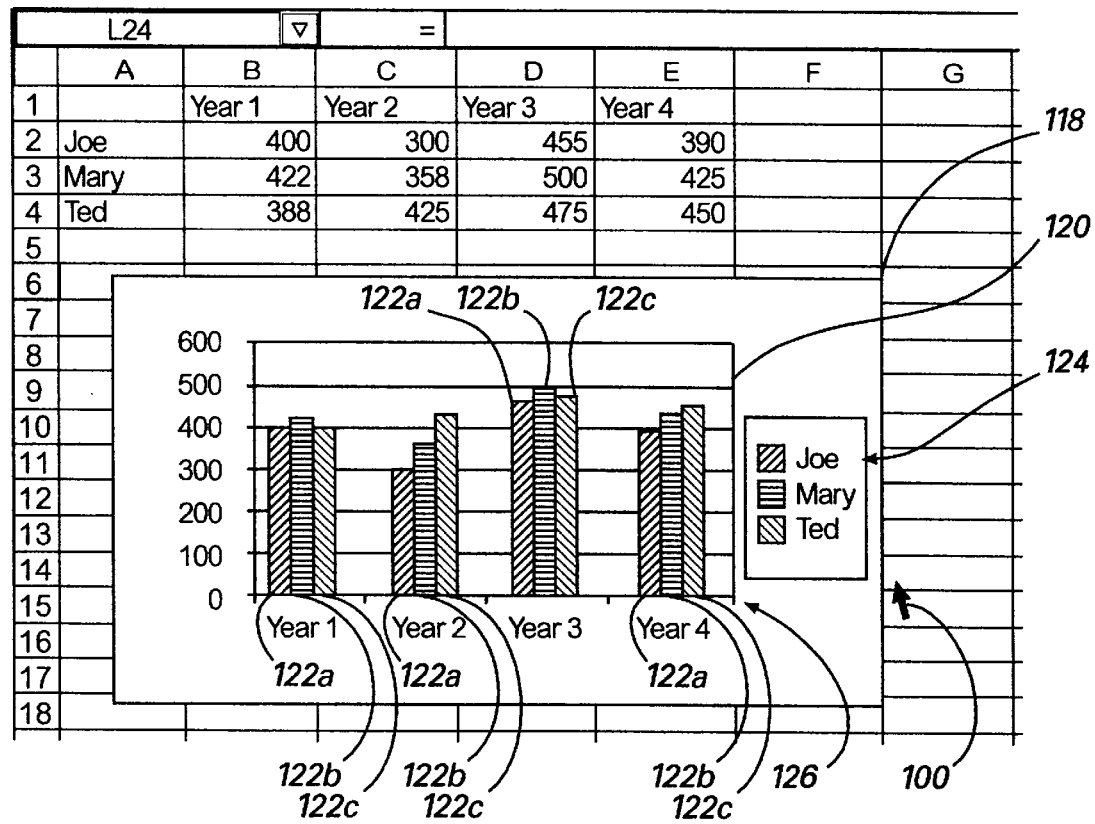
FIG. 5a illustrates a portion of a prior art spreadsheet screen display with an embedded graph.
Figure 5B:
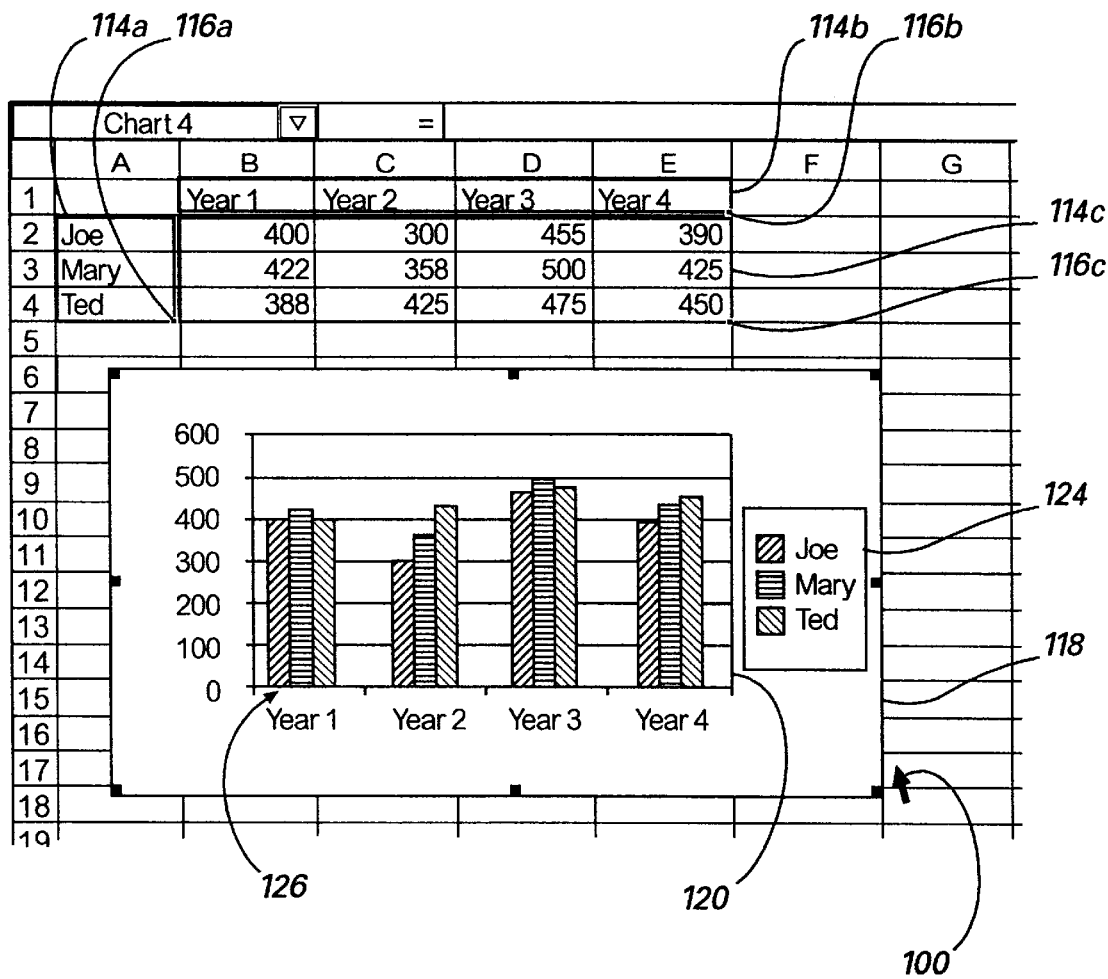
FIGS. 5b–e illustrate portions of spreadsheet screen displays, with embedded graphs, that include color-coded indicator borders, in accordance with the second exemplary embodiment of the present invention.
Figure 5C:
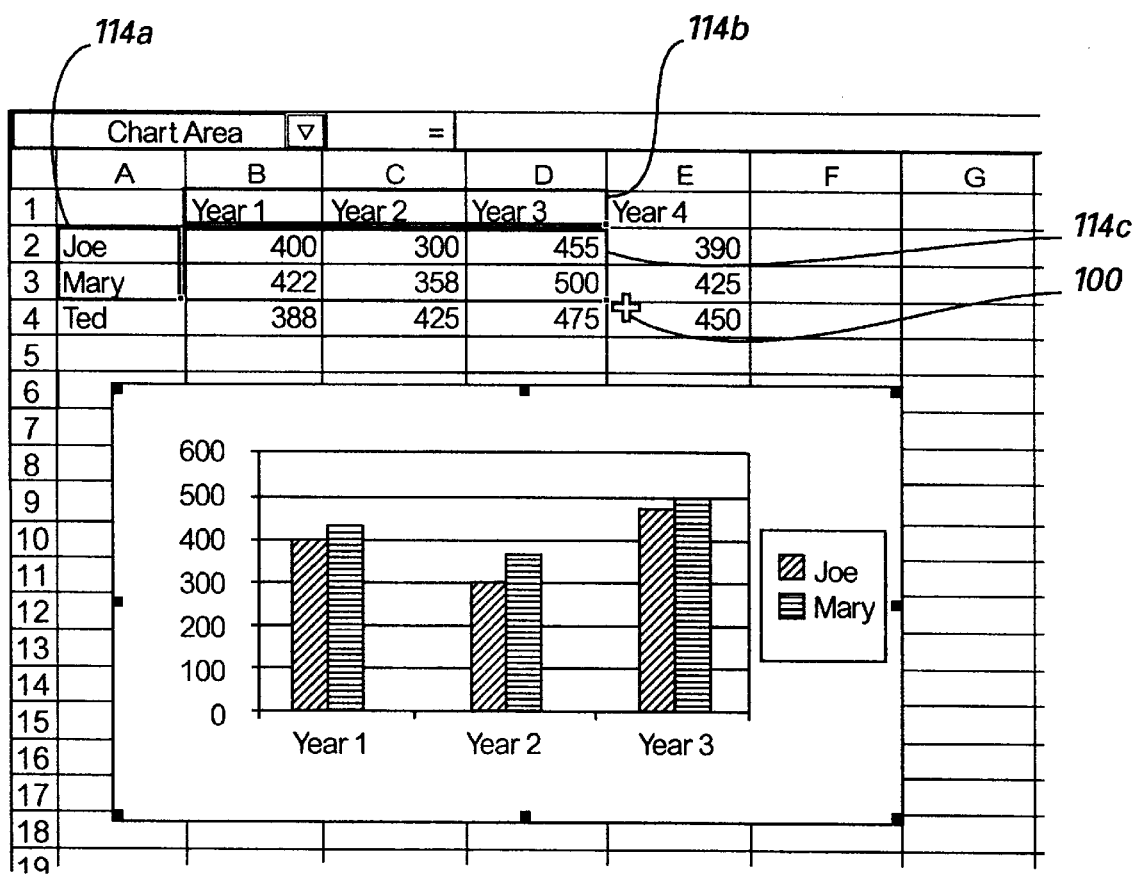
Figure 5D:
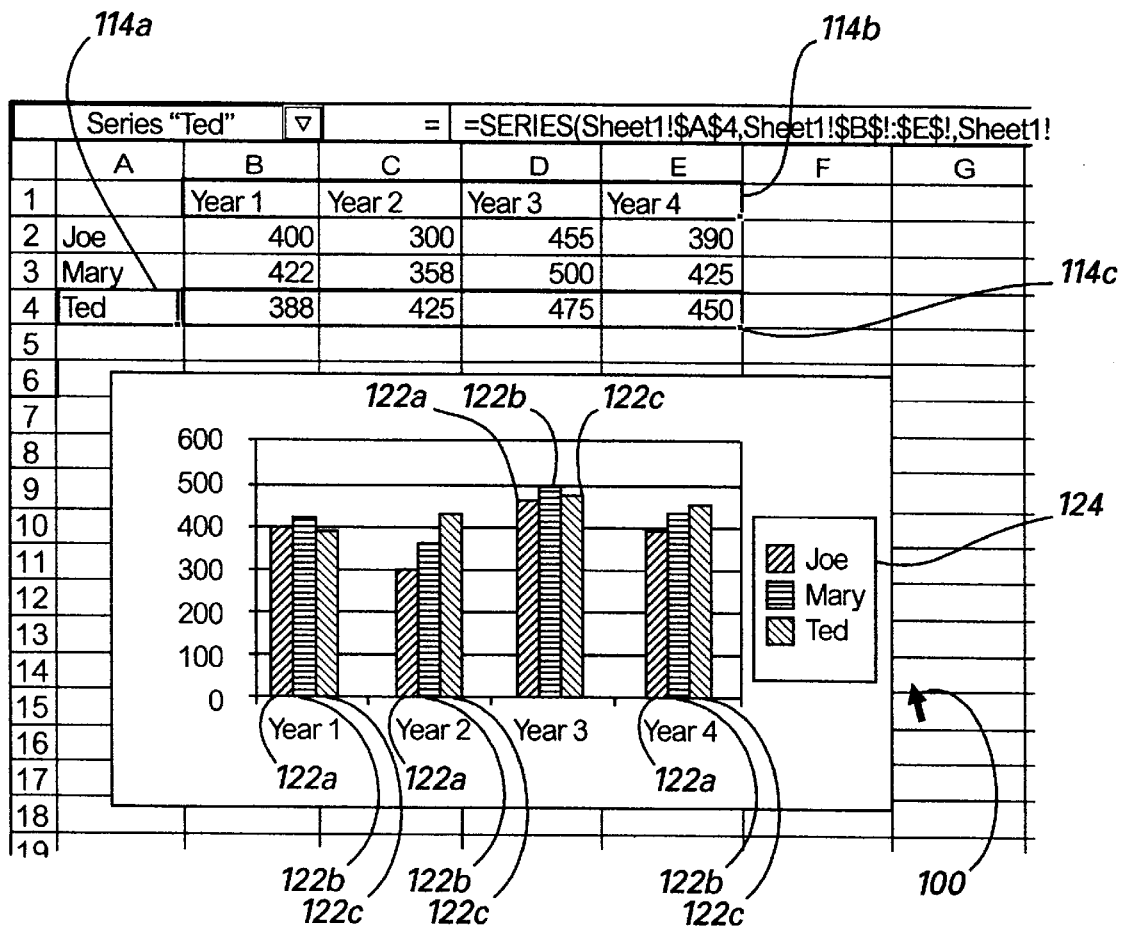
Figure 5E:
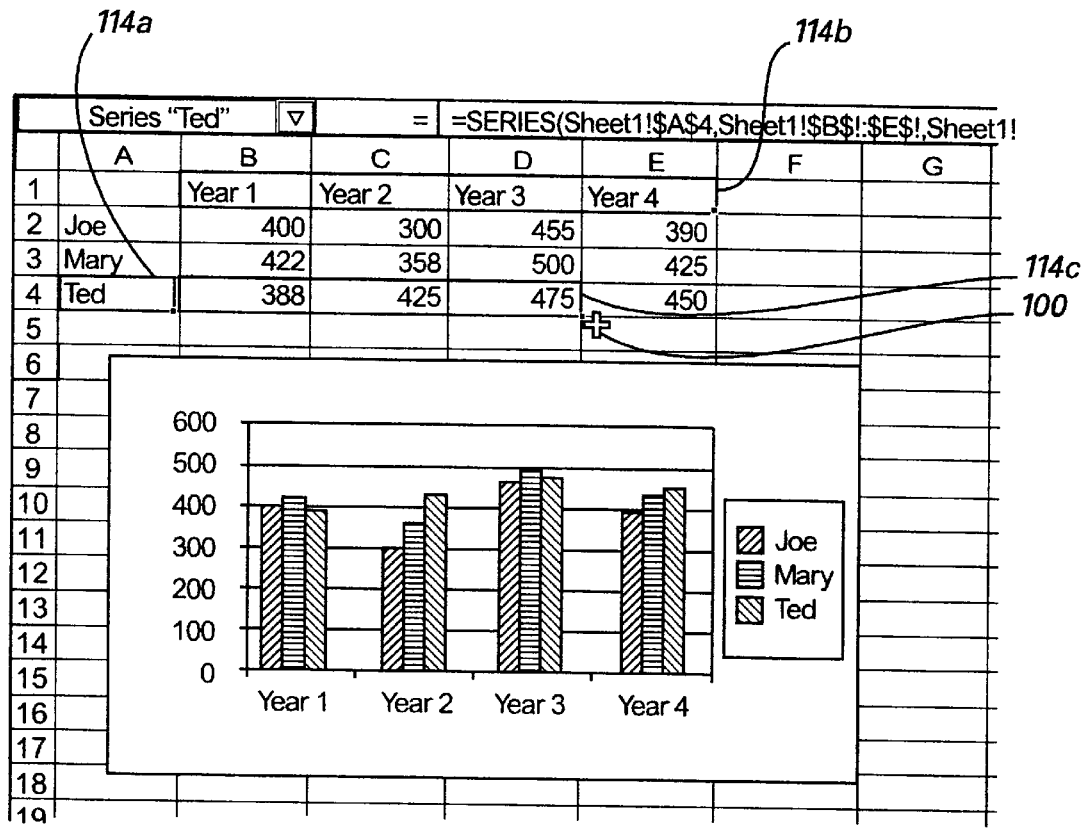
Figure 6:
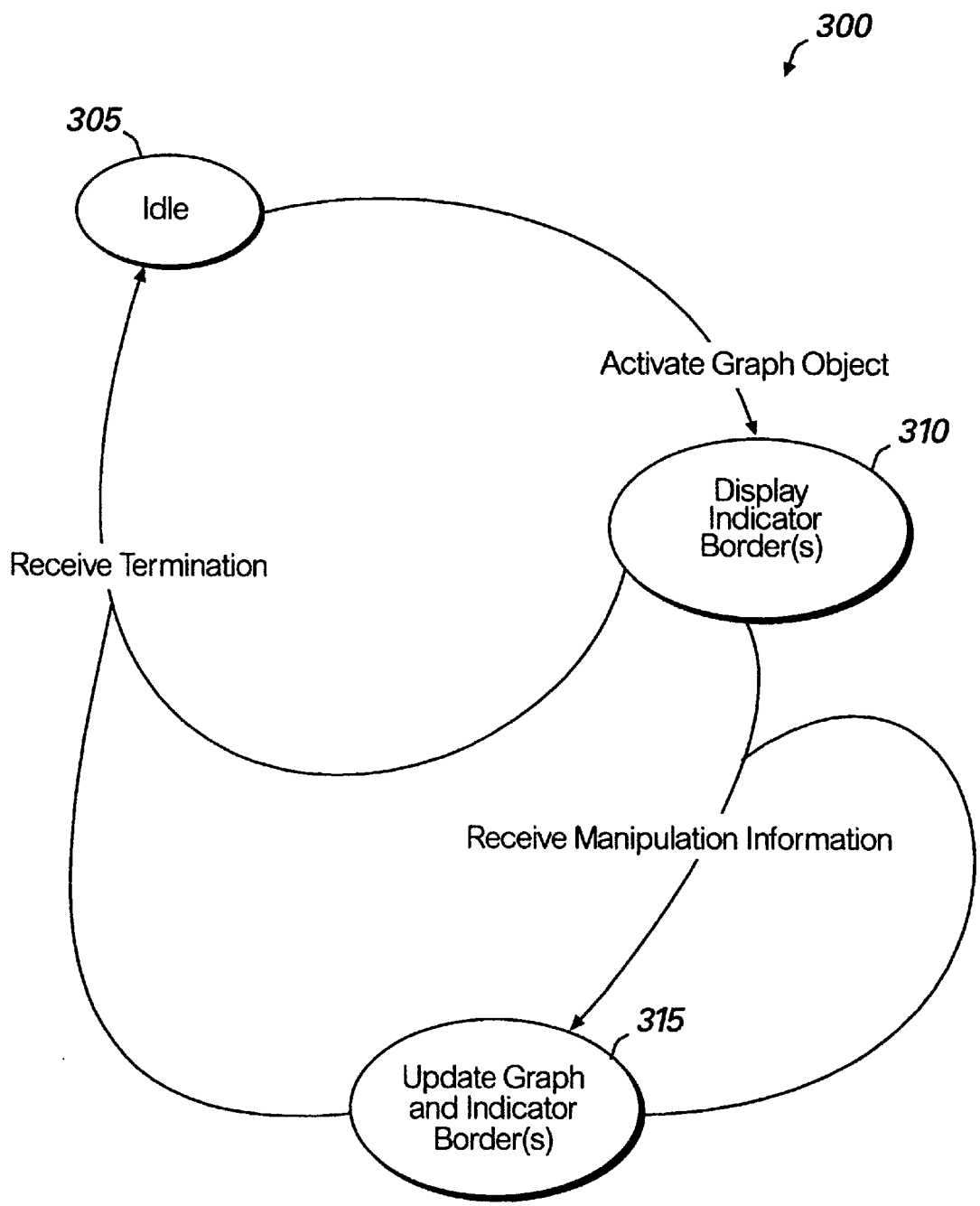
FIG. 6 is a state diagram illustrating an exemplary method for altering the characteristics a graph in response to manipulation of indicator borders, in accordance with the second exemplary embodiment of the present invention.

A second exemplary method for identifying and manipulating the source or sources (e.g., secondary objects such as cells or ranges of cells in a spreadsheet) that a primary object (e.g. an object in a graph) depends upon is illustrated in FIGS. 5*a–e*, which illustrate portions of spreadsheet screen displays with embedded graphs, and FIG. 6, which is state diagram that illustrates a second exemplary method 300. While FIGS. 5*b–e* illustrate portions of spreadsheet screen displays with embedded graphs that include indicator borders 114, like those of the first exemplary embodiment, FIG. 5*a* illustrates a portion of a prior art spreadsheet screen display with an embedded graph. The content of FIG. 5*a* should be appreciated by those skilled in the art since the screen display depicted in FIG. 5*a* is prior art.

Referring to FIG. 5*a*, a graph can include a graph area object 118, a plot area object 120 within the graph area object 118, and series of objects 122*a–c* within the plot area object 120. As depicted in FIG. 5*a*, each series of objects 122*a–c* includes four objects. The series of objects 122*a–c*, in conjunction with the bottom axis 126 and legend 124, provide a visual representation of a spreadsheet containing the graph. The series of objects 122*a* are dependent upon the data in row 2 of the spreadsheet, the series of objects 122*b* are dependent upon the data in row 3 of the spreadsheet, and the series of objects 122*c* are dependent upon the data in row 4 of the spreadsheet. The graphs can be conventionally arranged so that the series of objects 122*a–c* depend upon columns in the spreadsheet rather than rows. Also, while the graphs depicted in FIG. 5*a* are bar graphs, those skilled in the art will appreciate that the concepts of the present invention can be readily applied to other types of graphs.

Referring to FIG. 5*b*, when any of the graph area object 118, the plot area object 120, or the series of objects 122 are selected by a user, such as by placing the pointer 100 proximate to one of those objects and then clicking the associated mouse 42 (FIG. 2), the selected object or objects can be characterized as being activated. When any of the graph area object 118, the plot area object 120, or the series of objects 122 are activated, indicator borders 114 and indicator handles 116 like those of the first exemplary embodiment are displayed in the spreadsheet. For example, FIG. 5*b* illustrates movable and resizable indicator borders 114*a–c*, which include indicator handles 116*a–c*, respectively. The indicator borders 114*a–c* identify the information and data in the spreadsheet that the graph objects depend upon. Further, the indicator borders 114*a–c* can be manipulated on-screen by a user with the pointer 100 in generally the same ways as discussed with respect to the first exemplary embodiment of the present invention. Each corner of each indicator border 114 also can be equipped with an indicator handle 116, and each of those handles allow for resizing of the indicator border 114.

In FIG. 5b, the graph area object 118 has been selected by a user with the pointer 100. This selection is conventionally indicated by the small black boxes positioned around the periphery of the graph area object 118. If the plot area object 120 had been selected by the user, the small black boxes would be positioned around the periphery of the plot area object 120. Whenever the graph area object 118 or the plot area object 120 is selected, the cells that the series of objects 122a–c depend upon are bounded by the indicator border 114c, the cells that include the labels for the legend 124 (i.e., the cells that the legend object depends upon) are bounded by the indicator border 114a, and the cells that include the titles displayed proximate to the bottom axis 126 (i.e., the cells that the title objects at the bottom axis depend upon) are bounded by the indicator border 114b. The indicator borders 114a–c are given visual characteristics so that each is readily distinguishable from the others. For example, the indicator borders 114a–c are different colors. The indicator border 114a is green, the indicator border 114b is purple, and the indicator border 114c is blue.

When either the graph area object 118 or the plot area object 120 is selected by a user with the pointer 100, each of the indicator borders 114a–c can be moved or resized by a user with the pointer 100. On-screen manipulation of the indicator borders 114a–c (i.e., resizing or moving of the indicator borders 114) by a user is carried out in generally the same ways as discussed above with respect to the first exemplary embodiment, except that some limitations exist for the manipulation of the indicator borders 114 of the second exemplary embodiment. For example, the indicator border 114a can be expanded and moved by a user, but movement is not allowed to a column different from the one that the indicator border 114a is originally identifying. Similarly, the indicator border 114b can be expanded or moved by a user, but movement is not allowed to a row different from the one the indicator border 114b is originally identifying. The indicator border 114c can be expanded or moved by a user, but it is not allowed to occupy any portion of the row identified by the indicator border 114b or the column identified by the indicator border 114a. Further, when the indicator borders 114 have been activated as a result of selecting the graph area object 118 or the plot area object 120, movement of the indicator borders 114 is restricted; the indicator border 114a always extends across the same rows as the indicator border 114c, and the indicator border 114b always extends across the same columns as the indicator border 114c.

FIG. 5d illustrates a spreadsheet screen display with an embedded graph that is identical to the spreadsheet screen display with embedded graph depicted in FIG. 5a, except that the series of objects 122c have been selected and, as a result, square blocks and indicator borders 114 are added to the screen display. For example, when a single object of any one of the series of objects 122c is selected by a user with the pointer 100, square blocks are superimposed over the center of each object of the series of objects 122c to provide an indication of the selection of those objects. In addition, the indicator borders 114a–c and their respective indicator handles 116a–c are displayed in response to selection of the series of objects 122c. When a single series of objects 122 is selected by a user with the pointer 100, only the cells that the selected series of objects 122 depend upon are bounded by the indicator border 114c, only the cell(s) that includes the legend 124 label for the selected series of objects 122 is bounded by the indicator border 114a, and only the cells that include the titles for being displayed proximate to the bottom axis 126 for the selected series of objects 122 are bounded by the indicator border 114b. When a series of objects 122 is selected, the indicator borders 114a–c can be manipulated by a user with the pointer 100 in generally the same ways as discussed above.

Referring to FIG. 6, those skilled in the art will appreciate that the exemplary method 300 described by the illustrated state diagram is executed by the processing unit 21 (FIG. 2) in response to instructions that have been incorporated into one or more program modules. The method 300 begins at the idle state 305. The term "idle" is meant to indicate only that neither the graph area object 118, the plot area object 120, nor any of the series of objects 122 have been selected by a user. For example, FIG. 5a illustrates a spreadsheet screen display and embedded graph in the idle state 305. When a spreadsheet screen display and associated graph are in the idle state 305, and then any one of the graph area object 118, the plot area object 120, or any of the series of objects 122 are activated, for example by being selected, the method 300 proceeds to state 310. For example, the FIG. 5b and 5d depict a spreadsheet screen display in state 310.

In response to manipulation of the indicator borders 114 (FIG. 5b–e) while the method 300 is at state 310 or state 315, the method proceeds to state 315. At state 315, in response to and contemporaneous with the user manipulation that caused the transition to state 315, the screen display is updated. For example, FIG. 5c illustrate a spreadsheet screen display that includes an embedded graph and is similar to the screen display depicted in FIG. 5b, except that the indicator borders 114a–c have been moved by a user with the pointer 100. In response to the movements of the indicator borders 114a–c to the positions depicted in FIG. 5c, the graph is contemporaneously amended so that the graph appears as depicted in FIG. 5c. As an additional example, FIG. 5e illustrates a spreadsheet screen display that includes an embedded graph and is similar to the screen display depicted in FIG. 5d, except that a user has resized the indicator border 114c with the pointer 100. In response to the resizing of the indicator border 114c as depicted in FIG. 5e, the graph is contemporaneously amended to reflect the changes in its sources brought about by manipulation of the indicator border 114c.

From the foregoing description, it will be appreciated that the present invention provides an improved system and method for altering graph objects and spreadsheet cells that include cell formulas. In accordance with a first exemplary embodiment of the present invention, each spreadsheet cell or range of spreadsheet cells referenced within a selected cell formula is identified (e.g., bounded) by an indicator border. The indicator borders can be resized or moved by a user to select different spreadsheet cells or ranges of spreadsheet cells. In response, the references within the selected cell formula are modified. The references within the selected cell formula and their corresponding indicator borders are color-coded. This provides a simple, efficient way to decipher and alter references within cell formulas.

In accordance with a second exemplary embodiment of the present invention, spreadsheet cells or ranges of spreadsheet cells that define a selected graph object are bounded by color-coded indicator borders. The indicator borders can be resized or moved by a user to select different spreadsheet cells or ranges of spreadsheet cells. In response, the selected graph object is modified. This provides a simple, efficient way to decipher the cells that graph objects are dependent upon and alter graph objects.

The invention may conveniently be implemented in one or more program modules that are based upon the state diagrams of FIGS. 4 and 6, and the features illustrated in FIGS. 3b–e, and 5b–e. No particular programming language has been described for carrying out the various procedures described above because it is considered that the operations, steps, and procedures described above and illustrated in the accompanying drawings are sufficiently disclosed to permit one of ordinary skill in the art to practice the present invention. Moreover, there are many computers and operating systems which may be used in practicing the present invention and therefore no detailed computer program could be provided which would be applicable to all of these many different systems. Each user of a particular computer will be aware of the language and tools which are most useful for that user's needs and purposes.

Although the invention was described in the context of a spreadsheet software product, those skilled in the art will appreciate that the invention is applicable not only to spreadsheet software products, but also to other types of software.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims.

What is claimed is:

1. In a computer system having an input device and a graphical user interface including a display device operable for displaying a spreadsheet application program comprising a range of cells, a method for manipulating primary objects within a spreadsheet application program, that are dependent upon one or more range of cells, the method comprising the steps of:

receiving activation information by receiving from the input device an indication that a primary object has been activated;

in response to receiving activation information, performing a first sequence comprising the steps of, displaying on the graphical user interface a movable first indicator proximate to a first range of cells that the primary object is dependent upon; and displaying on the graphical user interface a symbolic expression that at least partially defines the primary object and comprises a first reference that identifies the first range of cells;

receiving first manipulation information by receiving from the input device an indication that at least a portion of the first indicator has been moved so that the first indicator is proximate to and identifies a second range of cells;

in response to receiving first manipulation information, making the primary object dependent upon the second range of cells rather than the first range of cells and replacing the first reference in the symbolic expression with a second reference that identifies the second range of cells; and associating a first visual characteristic with each of the first reference, the second reference, and the first indicator, wherein the first visual characteristic provides a visual cue as to the relationship between the first reference, the first range of cells, the second reference, the second range of cells, and the first indicator.

2. The method of claim 1, wherein the first indicator is capable of being:

expanded to include an additional cells, reduced in size to include a lesser number of cells, and moved to include a different cell.

3. The method of claim 1, wherein the primary object is an object in a graph displayed on the graphical user interface.

4. The method of claim 1, wherein the primary object is a symbolic expression.

5. The method of claim 1, wherein the primary object is a spreadsheet cell comprising a cell formula.

6. The method of claim 1, further comprising, in response to receiving activation information, the step of displaying on the graphical user interface a second indicator proximate to a third range of cells that the primary object is additionally dependent upon.

7. The method of claim 6, further comprising the steps of:

receiving second manipulation information by receiving from the input device an indication that the second indicator has been at least partially moved to be proximate to and identify a fourth range of cells, wherein one of the third range of cells and the fourth range of cells comprise a secondary object not included by the other; and in response to receiving second manipulation information, making the primary object dependent upon the fourth range of cells rather than the third range of cells.

8. The method of claim 1, wherein the first visual characteristic is a color.

9. The method of claim 1, further comprising the steps of:

in response to receiving activation information, displaying on the graphical user interface a movable second indicator proximate to a third range of cells that the primary object is additionally dependent upon, wherein the symbolic expression further comprises a third reference that identifies the third range of cell; and associating a second visual characteristic, which is distinct from the first visual characteristic, with each of the third reference and the second indicator, wherein the second visual characteristic provides a cue as to the relationship between the third reference, the third range of cells, and the second indicator.

10. The method of claim 9, wherein the first visual characteristic is a first color and the second visual characteristic is a second color.

11. In a computer system having an input device and a graphical user interface including a display device, a method for identifying a range of spreadsheet cells that a graph object is dependent upon, comprising the steps of:

receiving activation information by receiving from the input device an indication that the graph object has been activated; and in response to receiving activation information, displaying on the graphical user interface a first indicator proximate the range of spreadsheet cells to identify the range of spreadsheet cells;

displaying on the graphical user interface a symbolic expression that at least partially defines the graph object and comprises a first reference that identifies the range of spreadsheet cells; and associating a first visual characteristic with each of the first reference, the second reference, and the first indicator, wherein the first visual characteristic provides a visual cue as to the relationship between the first reference, the first range of cells, and the first indicator.

12. The method of claim 11, wherein the first indicator at least partially bounds the range of spreadsheet cells.

13. The method of claim 12, wherein the first indicator is capable of being expanded and moved to change the range of spreadsheet cells.

14. A computer-readable medium having computer executable instructions for performing steps comprising:

receiving activation information by receiving from an input device associated with a computer system an indication that a spreadsheet cell formula has been activated;

in response to receiving activation information, performing a first sequence comprising the steps of;

displaying on a graphical user interface associated with the computer system a movable and expandable first indicator proximate to a first range of spreadsheet cells that the spreadsheet cell formula is dependent upon; and displaying on the graphical user interface a symbolic expression that at least partially defines the primary object and comprises a first reference that identifies the first range of cells;

receiving first manipulation information by receiving from the input device an indication that at least a portion of the first indicator has been moved so that the first indicator is proximate to and identifies a second range of spreadsheet cells, wherein one of the first range of cells and the second range of cells comprise a spreadsheet cell not included by the other; and in response to receiving first manipulation information, making the spreadsheet cell formula dependent upon the second range of cells rather than the first range of cells and replacing the first reference in the symbolic expression with a second reference that identifies the second range of cells; and associating a first visual characteristic with each of the first reference, the second reference, and the first indicator, wherein the first visual characteristic provides a visual cue as to the relationship between the first reference, the first range of cells, the second reference, the second range of cells, and the first indicator.

15. The computer-readable medium of claim 14, further having computer-executable instructions for performing the steps of:

in response to receiving activation information, displaying on the graphical user interface a second indicator proximate to a third range of spreadsheet cells that the spreadsheet cell formula is additionally dependent upon;

receiving second manipulation information by receiving from the input device an indication that the second indicator has been at least partially moved to be proximate to and identify a fourth range of spreadsheet cells, wherein one of the third range and the fourth range comprise a spreadsheet cell not included by the other; and in response to receiving second manipulation information, making the spreadsheet cell formula dependent upon the fourth range rather than the third range, whereby the spreadsheet cell formula is changed.

16. The computer-readable medium of claim 15, further having computer-executable instructions for performing the steps of:

in response to receiving activation information, replacing the first reference in the spreadsheet cell formula with a second reference that identifies the second range; and associating a second color, which is distinct from the first color, with each of the third reference and the second indicator, wherein the second color provides a cue as to the relationship between the third reference, the third range, and the second indicator.

17. A computer-readable medium having computer executable instructions for performing steps comprising:

receiving activation information by receiving from an input device associated with a computer system an indication that a graph object has been activated;

in response to receiving activation information, displaying on a graphical user interface associated with the computer system a first indicator proximate to a first range of spreadsheet cells that the graph object is dependent upon; and displaying on the graphical user interface a second indicator proximate to a third range of spreadsheet cells that the graph object is additionally dependent upon;

receiving first manipulation information by receiving from the input device an indication that at least a portion of the first indicator has been moved so that the first indicator is proximate to and identifies a second range of spreadsheet cells, wherein one of the first range and the second range comprise a spreadsheet cell not included by the other; and in response to receiving first manipulation information, making the graph object dependent upon the second range rather than the first range and replacing the first reference in the symbolic expression with a second reference that identifies the second range of cells; and associating a first visual characteristic with each of the first reference, the second reference, and the first indicator, wherein the first visual characteristic provides a visual cue as to the relationship between the first reference, the first range of cells, the second reference, the second range of cells, and the first indicator.

18. The computer-readable medium of claim 17, wherein the computer executable instructions define that the first indicator at least partially bounds the first range and the second indicator at least partially bounds the second range, and each of the first indicator and the second indicator are capable of being:

expanded to include an additional spreadsheet cell, reduced in size to include a lesser number of secondary objects, and moved to include a different spreadsheet cell.

19. The computer-readable medium of claim 18, further having computer-executable instructions for performing the steps of:

in further response to receiving first manipulation information moving the second indicator to be proximate to and identify a fourth range of spreadsheet cells, wherein one of the third range and the fourth range comprise a spreadsheet cell not included by the other; and making the graph object dependent upon the fourth range rather than the third range, whereby the graph object is changed.

* * * * *